United States Patent [19]
Mantell et al.

[11] Patent Number: 6,141,114
[45] Date of Patent: Oct. 31, 2000

[54] EDGE ENHANCED ERROR DIFFUSION WITH ARTIFACT CORRECTION IN AREAS OF HIGHLIGHTS AND SHADOWS

[75] Inventors: David A. Mantell, Rochester; Reiner Eschbach, Webster, both of N.Y.

[73] Assignee: Xerox Corporation, Stamford, Conn.

[21] Appl. No.: 09/004,257

[22] Filed: Jan. 8, 1998

[51] Int. Cl.[7] .................................................. G06F 15/00
[52] U.S. Cl. ............................................. 358/1.9; 358/1.1
[58] Field of Search .......................... 395/109; 358/401, 358/530, 534, 535, 536, 1.9, 1.14, 80, 280, 1.1; 382/147, 237, 126, 456, 457, 270

[56] References Cited

U.S. PATENT DOCUMENTS

| | | | |
|---|---|---|---|
| 4,149,194 | 4/1979 | Holladay | 368/283 |
| 4,899,216 | 2/1990 | Tatsumi et al. | 358/80 |
| 5,045,952 | 9/1991 | Eschbach | 358/447 |
| 5,226,094 | 7/1993 | Eschbach | 382/41 |
| 5,353,127 | 10/1994 | Shiau et al. | 358/458 |
| 5,455,870 | 10/1995 | Sepai et al. | 382/147 |
| 5,535,019 | 7/1996 | Eschbach | 358/456 |
| 5,655,061 | 8/1997 | Tse et al. | 395/102 |
| 5,659,634 | 8/1997 | Yeh et al. | 382/232 |
| 5,699,490 | 12/1997 | Morikawa | 395/109 |
| 5,710,827 | 1/1998 | Perumal, Jr. et al. | 382/167 |
| 5,832,122 | 11/1998 | Shimazaki | 382/237 |

OTHER PUBLICATIONS

Floyd et al, "An Adaptive Algorithm for Spatial Greyscale", Proceedings of the SID 17/2, 75–77 (1976).

Eschbach et al, "Analytic Description of the 1–D Error Diffusion Technique for Halftoning", Optics Communications, vol. 52, No. 3, 165–168 (1984).

Billotet–Hoffmann et al, "On the Error Diffusion Technique for Electronic Halftoning", Proceedings of the SID, vol. 24/3 253–258, (1983).

Schroeder, "Images from Computers", IEEE Spectrum, Mar. 1969, pp. 68–78.

Kim et al, "New edge–enhanced error diffusion algorithm based on the error sum criterion", Journal of Electronic Imaging, 4(2), 172–178 (1985).

Eschbach et al, "Error Diffusion Algorithm with Edge Enhancement", Journal of the Optical Society of America A, 1844–1850 (1991).

*Primary Examiner*—Jerome Grant, II
*Assistant Examiner*—Douglas Tran
*Attorney, Agent, or Firm*—Mark Costello

[57] ABSTRACT

An error diffusion processor for preparing a document image for printing. Shadows and highlights regions stress error diffusion processes, because accumulated error cannot be easily compensated for in these regions. Edge enhancement emphasizes the problem by locally increasing error in order to maintain spatial detail of the image. The arrangement described puts an additional term into the error calculation that is a function of local intensity, with substantial value only in shadow and highlight regions to correct for edge enhancement artifacts.

8 Claims, 4 Drawing Sheets

EDGE ENHANCED ERROR DIFFUSION WITH ARTIFACT CORRECTION IN AREAS OF HIGHLIGHTS AND SHADOWS

CROSS REFERENCE

Cross reference is made to U.S. patent application Ser. No. 08/580,214, entitled "Method for Diffusing Errors According to Spot Size in a Printed Liquid Ink Image" by D. Mantell, filed Dec. 28, 1995, and assigned to the same assignee as the present application.

This invention relates to quantization or halftoning in document images, with edge enhancement, and more particularly to the use of error diffusion with edge enhancement in areas having highlights and shadows

BACKGROUND OF THE INVENTION

In the digital reproduction of documents, an image is conveniently represented as a bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user.

For color images, a plurality of bitmaps, each forming a color separation are combined. Each color separation may be defined by a number of gray levels in excess of the capability of the printer. In digital reproduction of color documents, each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

In printing documents, the desired density over an area is commonly achieved by halftoning, where image density variation is represented by placing greater or less numbers of ON pixels in a discrete area of the image. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the image pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Error diffusion is another halftoning method and is taught in "An Adaptive Algorithm for Spatial Greyscale" by Floyd and Steinberg, Proceedings of the SID 17/2, 75–77 (1976) (hereinafter, "Floyd and Steinberg"). Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. The output binary pattern of the error diffusion algorithm and its derivatives is a pattern with a local periodicity related to the input density level, but with no global periodicity, see "Analytic Description of the 1-D Error Diffusion Technique for Halftoning," Optics Communications, Vol. 52, No. 3, 165–168 (1984) by R. Eschbach and R. Hauck.

Other error diffusion methods include, "On the Error Diffusion Technique for Electronic Halftoning" by Billotet-Hoffmann and Bryngdahl, Proceedings of the SID, Vol. 24/3, (1983), pp. 253–258; and U.S. Pat. No. 5,226,094 to Eschbach. A technique related to error diffusion is taught in the MAE (Minimum Average Error) method of error diffusion described in "Images from Computers", by M. Schroeder, IEEE Spectrum, March 1969, pp. 66–78, in which an error correction is performed that only affects a local neighborhood. One particularly effective error diffusion variant is taught in U.S. Pat. No. 5,353,127 to Shiau et al.

Another method would be the error diffusion techniques of U.S. Pat. No. 5,045,952 to Eschbach (hereinafter, Eschbach), which provides image dependent edge enhancement. This method tends to create undesirable artifacts when processing some highlights and shadows, because the enhancement process does not respond quickly enough in shadow and highlight regions. This artifact appears as a "depletion zone", at edges which are in very light and/or very dark regions, perhaps as shown in FIG. 1. Although this artifact is rarely a problem in pictorial images, the depletion zone phenomenon is visually unattractive in text/graphics images.

"New edge-enhanced error diffusion algorithm based on the error sum criterion" by Kim et al., Journal of Electronic Imaging, 4(2), pp. 172–178 (1995), describes one possible way of addressing the problem identified with Eschbach, using an error sum criterion. The error function at each pixel location is compared to and edge function that identifies whether the pixel is near an edge. If the pixel is near an edge, a constant value is added to the error if the pixel prints white, and is subtracted if the pixel prints black.

U.S. patent application Ser. No 08/672,192, entitled "Phantom Level Edge Enhanced Error Diffusion", filed Jun. 27, 1996, by D. Mantell (one of the co-inventors of the present application) and assigned to the same assignee as the present application, includes generating a modified optical density value by adding an error value, if any, to the input level of one of the input pixels, generating a phantom output level as a function of the modified optical density level, determining the error value as a function of the selected phantom output level; and generating an output pixel having one of the output levels determined as a function of the modified optical density value.

All of the references cited herein are incorporated by reference for their teachings.

SUMMARY OF THE INVENTION

In accordance with the invention, there is provided a method of quantization or halftoning in document images with edge enhancement, and more particularly to the use of error diffusion with edge enhancement in areas having highlights and shadows that is a function of the image.

In accordance with one aspect of the invention there is provided a processing system for preparing a document image described by image signals at least partially described in terms of c levels, for output to an output device responding to output signals having d levels, to print the document image comprising: an image signal input, receiving image signals described in terms of c levels; halftoning error adder, adding halftoning error from given previous signals to said received image signals to produce modified image signals; an error diffusion circuit, producing for each modified image signal described in terms of c levels, an output signal described in terms of d levels responsive to a thresholding operation using a reference signal, and directing halftoning error signals to the halftoning error adder for addition to at least one adjacent and non-processed image signal in the document image, including: a reference signal generator, producing the reference signal responsive to an initial threshold value, the received image signal and a selected enhancement factor; a depletion zone correction signal generator, producing a correction signal responsive to a previous output signal, and the received image signal, and whether the received image is a light tone, a dark tone or a midtone correction signal application, applying the depletion zone correction signal to the image signal, in order to correct for improper rendition of highlight and shadow areas.

Edges at transition zones, in shadows and highlights regions, stress error diffusion processes, because accumulated error cannot be easily compensated for in these regions. Edge enhancement emphasizes the problem by locally allowing an increased error in order to maintain spatial detail of the image. The arrangement described here puts an additional term into the error calculation that is a function of local intensity, that has substantial value only in shadow and highlight regions. This variable addresses the problem of correction response, and substantially reduces the depletion zone. In addition, high enhancement factor values can be used to sharpen images, while avoiding the depletion zone artifact.

These and other aspects of the invention will become apparent from the following descriptions to illustrate a preferred embodiment of the invention read in conjunction with the accompanying drawings in which.

Figure 2:
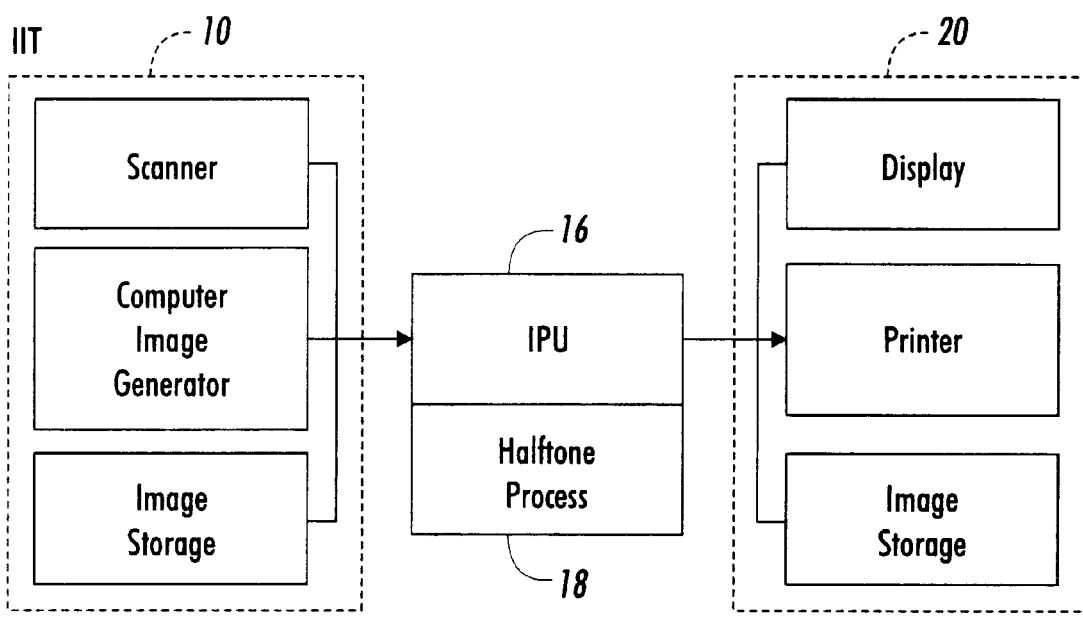
FIG. 2 is a simplified description of a system in which the present invention may find advantageous use.

Referring now to the drawings where the showings are for the purpose of describing an embodiment of the invention and not for limiting same, a basic image processing system is shown in FIG. 2. In the present case, gray image data may be characterized as image signals or pixels, each being defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a density between a minimum and a maximum. Accordingly, pixels are defined by intensity and position. "Gray", as used herein does not refer to a color unless specifically identified as such. Rather, the term refers to image signals which vary between maximum and minimum, irrespective of the color of the separation in which the signals are used.

In a color system, color documents are represented by multiple sets of image signals (bitmaps), each set (or separation) represented by an independent channel, which is usually processed independently. A "color image" is therefore a document including at least two separations, such as in the Xerox 4850 Highlight Color Printer and commonly three or four separations, such as in the Xerox 4900 Color Laser or sometimes more than four separations. One possible digital copier (a scanner/printer combination) is described for example, U.S. Pat. No. 5,655,061 or U.S. Pat. No. 5,659,634 incorporated herein by reference. Each document provides a set of image signals or will drive a printer to produce an image. In the case of multicolor printers, the separations, each sets of image signals or pixels, superposed together, form the color image. In this context, we will describe pixels as discrete image signals, which represent optical density of the document image in a given small area thereof.

With reference now to FIG. 2, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at m bits per pixel. Common scanners, such, for example, produce 8 bit/pixel data, at resolutions acceptable for many purposes. If this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts a c bit digital image signals to d bit digital image signals, suitable for driving a particular printer, where c and d are integer values.

Before entering into a description of an embodiment of the invention, the principle of the invention will be discussed. The cause for the depletion zones lies in the fact that the accumulated error can not be easily compensated for in very light and/or very dark regions. The edge enhancement emphasizes this problem by locally allowing an increased error in order to maintain spatial detail of the image, The problem is reduced by adding and additional compensation error term, call it EE, into the error diffusion with edge enhancement process that is a function of local intensity and the actual binary output value B(n). The function, however, is designed so that it is effective only in very light or very dark images area. The one dimensional form of the method is given as:

$$B(n) = \text{step}\left\{\sum_{i=0}^{n-1} \langle I(i) + E(i) + EE\{B(i), I(i)\}\rangle + \kappa I(n) - t_0\right\}$$

Where B(n) is the output or reduced level signal at the n-th pixel, I(i) is the input image signal at the ith pixel, E(i) is the normal error diffusion error for the ith input pixel, κ is the edge enhancement factor, $t_0$ is a constant as described in U.S. Pat. No. 5,045,592, and EE is the correcting error introduced in this invention that is a function of the previous output pixel n−1, and the input image I.

In order not to influence the overall reproduction of the image, these additional error terms have to sum to zero over a preselected area:

$$(255-I)EE_{black}(I) = -(I)EE_{white}(I) \quad (1)$$

where the subscripts "white" and "black" refer to the output value of the current pixel and I refers to local input intensity. The value 255 is an example value related to the number of levels of gray in a system, and can be larger or smaller as the system uses more or less bits to describe gray pixels. The above equation guarantees that in the preselected area, an intensity range that is produced by, for example, L black and ¼ L white pixels (where L and ¼ L are integers related to a relatively small area of the image), the extra error terms of L black and ¼ L white pixels sum to zero.

A similar process, not concerned, however with overcoming the problems of enhancement artifacts, is described in U.S. Pat. No. 5,535,019 to Eschbach, incorporated herein by reference.

Figure 1A:
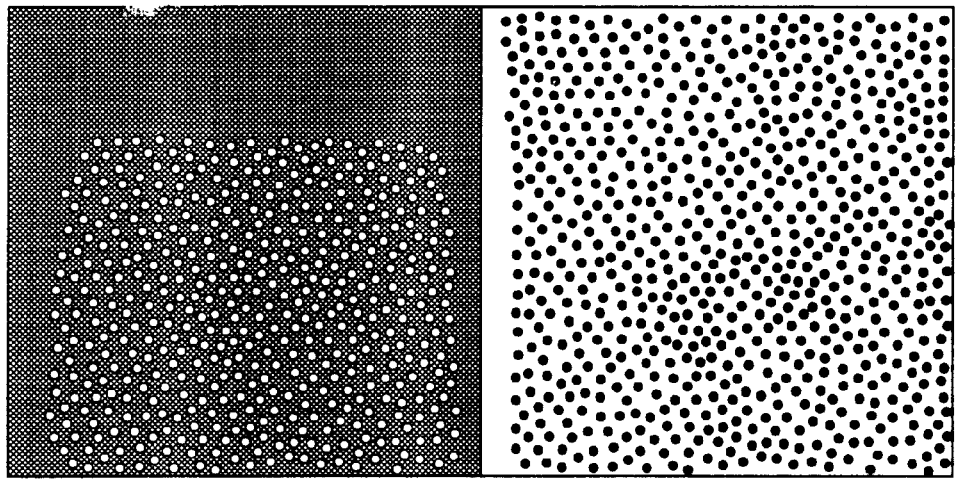
FIGS. 1A and 1B are examples of the depletion zone artifact encountered in using edge enhancing error diffusion, and the correction offered by the present application.
Figure 1B:
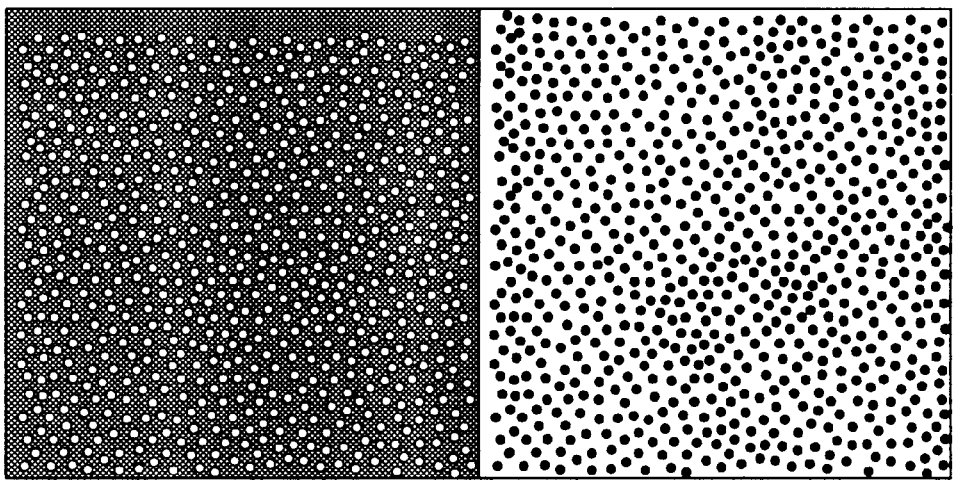

After guaranteeing that the correct reproduction of average gray will occur, the extra error terms can be set to:

$EE_{white}[I]=C \quad 0 \leq x < 8$ $EE_{white}[I]=C((96-1)/88) \quad 8 \leq x < 96$ $EE_{white}[I]=0 \quad 96 \leq x < 128$ with the corresponding $EE_{white}$ terms as given above. The constant value C is dependent on the edge enhancement factor κ. It has been found experimentally that C=256(κ−1) is a good choice, giving C=1024 for an edge enhancement factor κ=5. Highlights are treated in a symmetric fashion, FIG. 1B shows the results of the modification, noting that in this simplistic example, an extreme step height (gray level difference between areas) and edge enhancement factor was selected to emphasize the difference. It should be noted that the edge enhancement using a factor κ is only one of the method described in U.S. Pat. No. 5,045,952 and that the method described in this invention can be equally well applied to the other methods described in that patent and in "Error Diffusion Algorithm with Edge Enhancement," Journal of the Optical Society of America A, pp. 1844–1850 (1991), by Eschbach and Knox. It will be appreciated that the individual parameters might change values, but that the invention still applies.

The proposed method achieves performance improvement by reducing edge enhancement in areas that are not capable of reproducing enhanced edge (i.e., shadows and highlights) and by maintaining the enhancement in regions that are capable or reproducing enhanced edges (i.e., midtones).

Considering the principles of the invention, other parts of the error diffusion algorithm suggested by Floyd and Steinberg and modified by U.S. Pat. No. 5,045,952 and others are straightforward to implement in conjunction with the invention, as are modifications of the error calculation and weight allocation.

Figure 3:
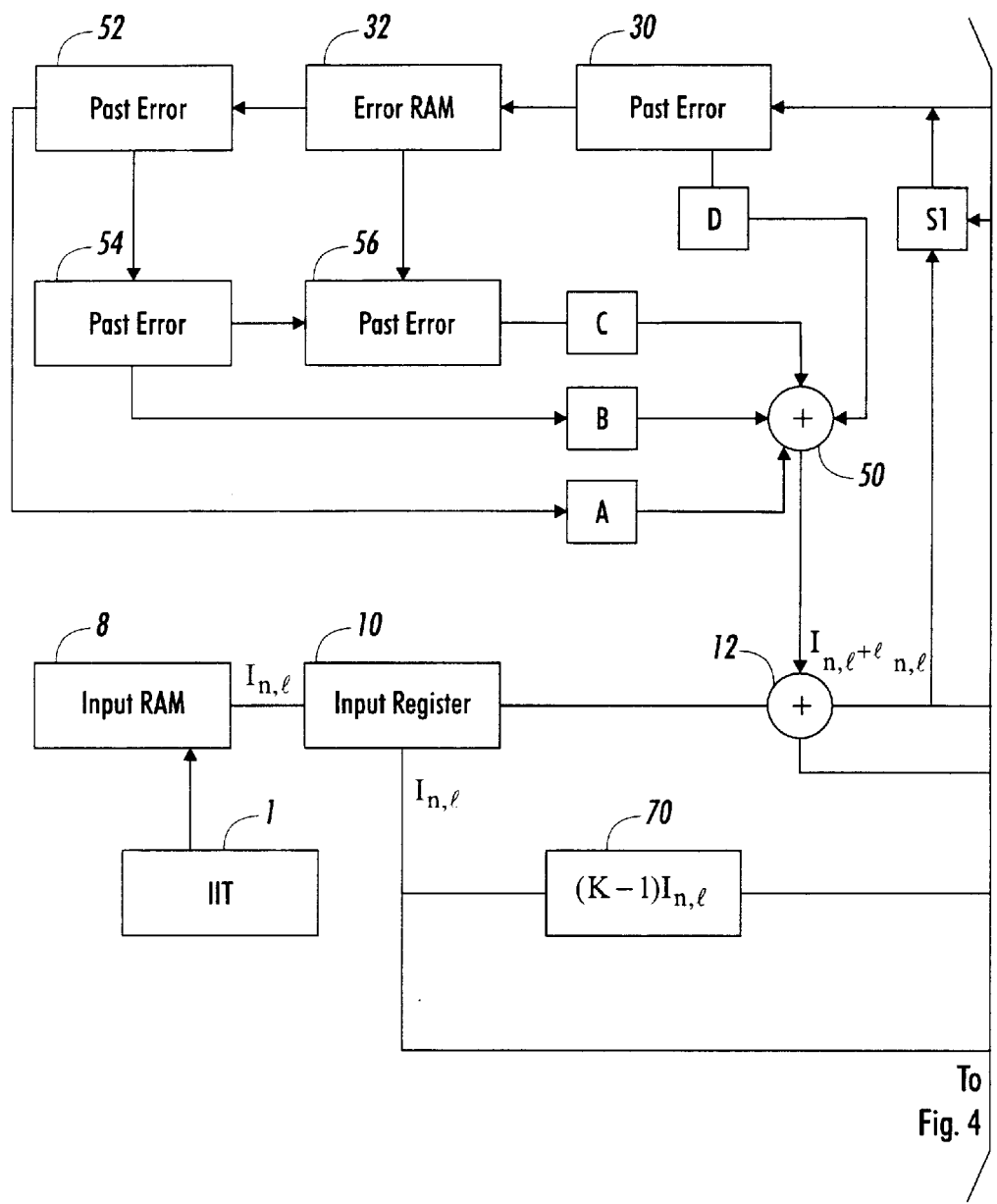
FIGS. 3 and 4 together show an error diffusion circuit useful in the present invention.
Figure 4:
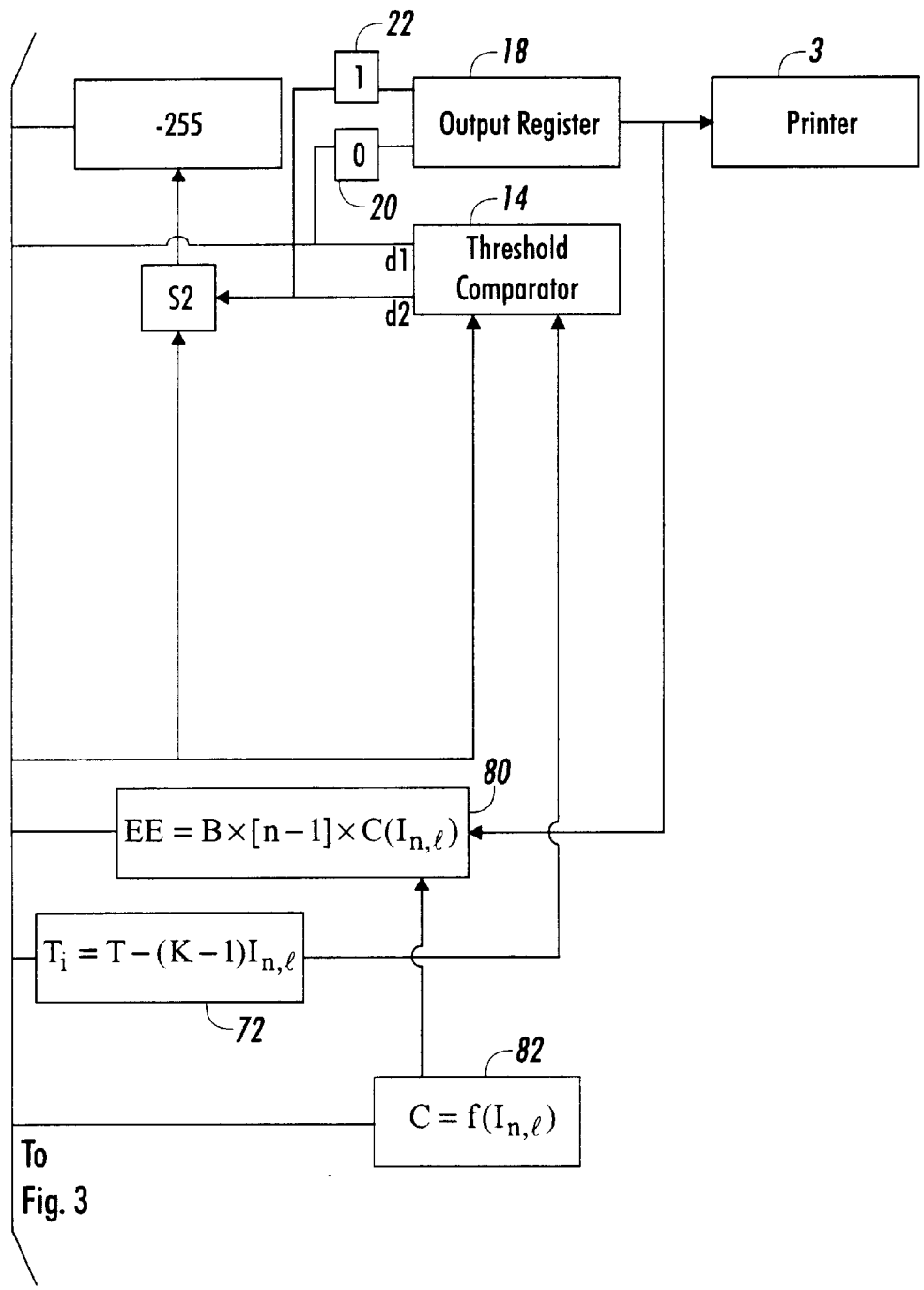

FIGS. 3 and 4 together illustrate a possible implementation of the error diffusion portion of this invention. There may be a number of error diffusion circuits corresponding to the number of separations to be processed, or there may be a single circuit which is used plural times for plural separations. The present embodiment assumes the former. A stored array of input image signals representing a single separation $I_{S2}$ stored at input RAM 8, which may be from any image input device 1 (see, FIG. 2) operated in accordance with suitable driver software, or may be a computer generated representation, directs input image I into the system on a signal by signal basis, where n,1 represents the position of a single separation image signal I(n, 1) in a stream of image signals. Such gray level signals or pixels, generally defined as multi bit or N bit values, which defines $2^N$ or 'c' possible levels of optical density. Initially, a single signal I(n, 1) is stored from input RAM or other storage device 8 suitable for holding a portion of image I to an input register 10 which is a storage device suitable for storing such a multi-bit signal. Each input signal, stored at input register 10, has a corresponding error correction signal ε added to the image signal I at signal adder 12 where ε(n, 1) is a sum of weighted error term signals of previous pixels to be added to I(n, 1) resulting in a modified image signal. In cases where no previous error signal or only a partial error signal is available, e.g. at the beginning of the page or the beginning of a scanline, pseudo error signals are often generated. Examples are loading the error buffer with random/pseudo-random numbers, repetitive processing of some initial scanlines or collecting an error from the end of the previous scanline. The modified image signal, the sum of the input image signal and the error correction signal of previous pixels (I(n, 1)+ε(n, 1)), is passed to threshold comparator 14, where it is compared to the threshold signal $T_i$ generated in accordance with the invention, to determine the corresponding output state $d_i$, where the drawing shows the case for two output states $d_1$ and $d_2$ for simplicity, although more output levels are possible. States $d_1$ and $d_2$ correspond to an appropriate output signal B(n, 1) for pixel I(n, 1) such as, for example, for a binary output printing system, a spot or no spot. Responsive to this comparison, if the signal I(n, 1)+ε(n, 1) is greater than the reference, then an image signal representing a single "set" or colored spot is directed to output register 18 from RAM memory 22. If responsive to this comparison, signal I(n, 1) +ε(n, 1) is less than the reference, then an image signal representing a single black spot is directed to output register 18 from memory 20. If a black pixel is directed to output register 18, switch $S_2$ is enabled to allow the modified input image signal I(n, 1)+ε(n, 1) to be stored to error register 30 after being modified by the additional error term EE of block 80 at adder 82. If a white pixel is directed to output register 18, switch $S_2$ is enabled to allow the modified input image signal I(n, 1)+ε(n, 1) to be stored to error register 30, after having a value equal to the value set (255 in the 8 bit case) subtracted from the signal and after being modified by the additional error term EE of block 80 at adder 82. Pixels stored to output register 18 are eventually directed to output device 3 (FIG. 2). In the present case, where I represents a single separation of an image, with or without further correlation processing, the separation may be printed at a color printer.

Error determined in the quantization of pixels is stored at error RAM 32, until an image signal which requires the addition of error passes through the system. Then, the portion of the stored errors from previous quantization is directed to adder 50 from past error registers 52, 54, 56 and error register 30. Error registers 52, 54, 56 are connected to allow the error signal to be shifted from register to register as a line of data is directed through the described system. Error signals are directed through multipliers or table lookups A, B, C and D, respectively, in accordance with Floyd and Steinberg type error diffusion, with a weighting scheme selected as desired. Note that the use of four error signals is for illustrative purposes only and that lesser or larger numbers might be used in the actual implementation. Signal adder 50 produces signal $\epsilon(n, 1)$ to be added to $I(n, 1)$, resulting in a modified image signal. The modified image signal, the sum of the input image signal and the error correction signal of previous pixels is given by $(I(n, 1)+\epsilon(n, 1))$. Note also the weighting function U.S. Pat. No. 5,353,127 to Shiau et al., which could be directly substituted into this arrangement.

Returning to FIGS. 3 and 4, and in accordance with the invention, in accordance with Eschbach, threshold Ti is a function of an original value T, an enhancement factor $\kappa$, and the image itself, so that $$T_i = T - (\kappa - 1)I(n, 1).$$

This is illustrated with on the block diagram with elements 70 and 72.

The threshold modulation of blocks 70 and 72 creates a desired sharpening effect of the output image. However it also results in the undesirable depletion effect. The problem is reduced by adding an additional error term, call it EE of block 80, into the error diffusion with edge enhancement process that is a function of local intensity and the actual binary output value B(n). The value EE, is calculated at error term enhancement 80, and the result is added to the error value at adder 82.

The intention of the error correction term EE is to eliminate depletion artifacts at edges in highlight and shadow areas, without impacting the overall image quality. One way to achieve this is to balance the error correction for black and white pixels as given in equation (1). The second approach is to create an error correction term that is a function of the input level, creating a larger correction for highlight and shadow and a smaller or disappearing correction for midtone areas. As was described previously, the dependence of EE on the input level is $EE_{white}[I] = C$  $0 \leq x < 8$ $EE_{white}[I] = C((96-I)/88)$  $8 \leq x < 96$ $EE_{white}[I] = 0$  $96 \leq x < 128$ with the corresponding $EE_{white}$ terms as given above. The final correction term EE is calculated as $EE = EE_{black}$ if B=black and as $EE = EE_{white}$ if B=white, indicates as EE(B (n),1) in block 80. FIG. 1B shows the results of the modification, noting that in this simplistic example, an extreme step height (gray level difference between areas) and edge enhancement factor was selected to emphasize the difference.

The proposed method achieves performance improvement by reducing edge enhancement in areas that are not capable of reproducing enhanced edge (i.e., shadows and highlights) and by maintaining the edge enhancement in regions that are capable or reproducing enhanced edges (i.e., midtones).

It will also be appreciated by those of skill in the art that changing the threshold against which the modified image signal is compared is completely equivalent to adding the threshold value to the modified signals, and comparing the modified signal to a fixed threshold. Such an arrangement is well within the scope of the invention.

It will also be appreciated that the described method can be combined with other error diffusion implementations that use additional threshold modulation, or that modify the error allocation in whole or in part.

It will no doubt be appreciated that the present invention may be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A processing system for preparing a document image described by image signals at least partially described in terms of c levels, for output to an output device responding to output signals having d levels, to print the document image comprising:

an image signal input, receiving image signals described in terms of c levels;

halftoning error adder, adding halftoning error from any previous signals to said received image signals to produce modified image signals;

an error diffusion circuit, producing for each modified image signal described in terms of c levels, an output signal described in terms of d levels responsive to a thresholding operation using a reference signal, and directing halftoning error signals to the halftoning error adder for addition to at least one adjacent and non-processed image signal in the document image, including:

a reference signal generator, producing the reference signal responsive to an initial threshold value, the received image signal and a selected enhancement factor;

a depletion zone correction signal generator, producing a correction signal responsive to a previous output signal, and the received image signal, and whether the received image is a light tone, a dark tone or a midtone;

correction signal application, applying the depletion zone correction signal to the modified image signal, in order to correct for improper rendition of highlight and shadow areas.

2. The processing system as described in claim 1, wherein said d levels represents a binary output system.

3. The processing system as described in claim 1, wherein said error diffusion circuit directs halftoning error to a plurality of non-processed image signals, on a weighted basis.

4. The processing system as described in claim 1, wherein said reference signal generator generates the reference signal in accordance with the function:

$$T_i = T - (\kappa - 1)I(n, 1),$$

where $T_i$ is the reference signal, T is initial reference signal, $\kappa$ is the enhancement factor, and $I(n, 1)$ is the image signal to be processed.

5. A processing system for preparing a document image described by image signals at least partially described in terms of c levels, for output to an output device responding to output signals having d levels, to print the document image comprising:

an image signal input, receiving image signals described in terms of c levels;

an error diffusion processor, operating responsive to said received image signals to produce output signals in terms of d levels, and distribute halftoning error to at least one unprocessed image signal, and enhancing edges;

a depletion zone correction processor, strongly operative in highlight and shadow areas of said document image and weakly operative in midtone areas of said document image, and adding correction error to said halftoning error responsive to a previous output signal and the received image signal.

6. The processing system as described in claim 5, wherein said d levels represents a binary output system.

7. The processing system as described in claim 5, wherein said error diffusion circuit directs halftoning error to a plurality of non-processed image signals, on a weighted basis.

8. The processing system as described in claim 5, wherein said error diffusion processor includes:

an edge enhancing processor, enhancing edges in said document images, by varying a threshold value in said error diffusion processor, said edge enhancing processor generating the reference signal in accordance with the function:

$$T_i = T - (\kappa - 1) I(n, \mathbf{1}),$$

where $T_i$ is the reference signal, T is initial reference signal, $\kappa$ is the enhancement factor, and $I(n, \mathbf{1})$ is the image signal to be processed.

* * * * *